United States Patent [19]
deVries

[11] 4,308,241
[45] Dec. 29, 1981

[54] FORMATION OF REACTIVE DROPLET DISPERSION

[75] Inventor: Egbert deVries, Kettering, Ohio

[73] Assignee: Quad Environmental Technologies Corp., Highland Park, Ill.

[21] Appl. No.: 167,482

[22] Filed: Jul. 11, 1980

[51] Int. Cl.³ ............................................. B01D 53/34
[52] U.S. Cl. .................... 423/210; 423/224; 423/240; 423/242; 423/245; 422/5
[58] Field of Search ............... 423/210, 224, 240, 245, 423/242 A; 422/5, 4; 55/68, 73

[56] References Cited

U.S. PATENT DOCUMENTS

| | | | |
|---|---|---|---|
| 2,532,554 | 12/1950 | Joeck | 239/4 |
| 3,375,058 | 3/1968 | Petersen et al. | 423/210 R |
| 3,421,699 | 1/1969 | Babington et al. | 239/337 |
| 3,852,408 | 12/1974 | Ewan et al. | 423/242 A |
| 3,852,409 | 12/1974 | Martin et al. | 423/242 A |
| 3,885,918 | 5/1975 | Isahaya | 423/242 A |
| 4,083,932 | 4/1978 | Muraco et al. | 423/210 R |
| 4,125,589 | 11/1978 | de Vries | 423/210 R |
| 4,141,702 | 2/1979 | de Vries | 55/94 |
| 4,172,880 | 10/1979 | Tzavos | 423/210 R |
| 4,225,566 | 9/1980 | de Vries | 423/210 |

*Primary Examiner*—Earl C. Thomas
*Attorney, Agent, or Firm*—Fidelman, Wolffe & Waldron

[57] ABSTRACT

A jet pump or ejector employing steam as the motive fluid is used to produce a dispersion of fog-like liquid droplets containing a reactive chemical in a gas stream. A solution of the reactive chemical is metered to the suction side of the ejector which discharges into the gas stream. Temperature and relative humidity of the gas stream are maintained at levels whereat the ejector discharge condenses to form very tiny liquid droplets containing the reactive chemical.

16 Claims, 2 Drawing Figures

FORMATION OF REACTIVE DROPLET DISPERSION

BACKGROUND OF THE INVENTION

This invention relates generally to the formation of a dispersion of reactive liquid droplets in a gas stream.

More particularly, this invention relates to the production of a fog-like dispersion of aqueous droplets containing a chemical reagent for reaction with a constituent of a process gas stream.

It has long been common practice to scrub process gas streams with water or with water solutions of chemical reagents to remove noxious gases therefrom. A wide variety of gas-liquid contacting devices have been developed for this purpose. It is also known to contact gas streams with a very finely divided dispersion of liquid reagent-containing droplets, typically having a median diameter of 10 microns or less, to react with noxious contaminants as is shown by the inventor's prior U.S. Pat. No. 4,125,589. This last process has found industrial acceptance, especially for the removal of offensive odors from gas streams such as those produced in rendering plants.

Use of very finely divided reactive droplets to react with noxious gaseous constituents is substantially more efficient than are the more conventional contacting procedures. Individual droplets, being of much smaller size, display a proportionately larger reactive surface area per unit volume of liquid. The number of individual droplets present in a unit volume of reaction zone is substantially increased, often by several orders of magnitude. Consequently, the distance between adjacent droplet surfaces is greatly lessened thus increasing the chance of collision or contact between a droplet and a reactive or noxious molecule or particle. Because the settling rate of tiny (about 10 microns or less) droplets is so slow, contact time between an individual droplet and gas stream is ordinarily not limited by droplet fall time but is instead determined by gas residence time within the reaction zone. All of these result in a greater contact between reactant and gaseous contaminant whereby much more complete reagent usage is achieved so that scrubbing liquid recycle may be eliminated.

The finely divided reactant dispersion is typically formed by use of ultrasonic nozzles of the general type disclosed, for example, in U.S. Pat. No. 2,532,554. One of the difficulties experienced use of such nozzles lies in their small fluid channels and resonator cavities which tend to plug and to wear especially when the chemical reagent used is corrosive.

Another disadvantage of ultrasonic nozzles is in the use of relatively high volumes of compressed air as the atomizing agent. This requires large compressors, and high energy usage to produce the compressed air. There is also a tendency for air expanding from the nozzle to cause freezing during winter operation.

SUMMARY OF THE INVENTION

An aqueous solution of a reactive chemical is metered into the suction entry of a steam driven jet pump, is mixed with the steam and is at least partially evaporated during passage therethrough. A very finely divided dispersion of reactive liquid droplets is formed in a gas stream by condensation of the exhaust from the jet pump in the gas stream. The gas stream is maintained at a temperature below the steam temperature and the relative humidity of the gas stream is maintained at a level whereat the steam condenses to form a fog-like dispersion of reactant-containing droplets. The reactive chemical is selected and its introduction rate determined so as to neutralize, precipitate or otherwise react with the noxious contaminants in the gas stream. Thereafter the liquid droplets, now containing the reaction product of the chemical and the contaminant, are separated from the gas stream.

Hence, it is an object of this invention to provide a reactive dispersion of liquid droplets in a gas stream.

It is another object of this invention to provide a fog-like reaction medium to chemically interact with one or more constituents of a gas stream.

Yet another object of this invention is to remove noxious constituents of a gas through use of a finely divided dispersion of liquid droplets.

DESCRIPTION AND DISCUSSION OF THE INVENTION

This invention comprises the use of a jet pump to create a fog-like reactive dispersion for use in gas cleaning processes. Jet pumps are well known and widely used devices powered by pressurized gas, liquid or steam. They can perform a variety of functions in handling liquids, gases, vapors and dry granular solids including pumping, heating, mixing, evacuating, exhausting and similar functions.

Jet pumps commonly go by a variety of names according to the function they perform, including, for example, ejectors, exhausters and eductors. All operate on the same principle of one fluid entraining a second fluid. Jet pumps suitable for use in this invention include these which use steam as a motive fluid, can accept a liquid suction stream, and discharge at a pressure intermediate to inlet and suction pressures. As this type of jet pump is commonly known as an ejector, the two names will be used interchangeably hereafter.

Figure 1:
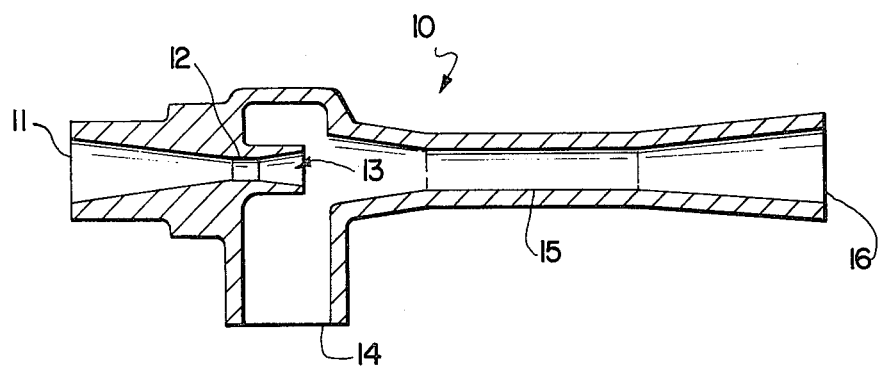
FIG. 1 is a cross-sectional view of a jet pump suitable for use in the process.

Referring now to FIG. 1, there is shown in cross-section a jet pump or ejector 10 suitable for use in this invention. Steam inlet 11 converges to throat area 12 and thereafter diverges in nozzle area 13. During its passage through the nozzle, pressure energy of the steam is converted largely to kinetic energy leaving the discharge side of the nozzle at high velocity. A reagent-containing water stream is metered into the suction port 14 of the ejector where it mixes with and is entrained by the high velocity steam. The steam and entrained aqueous reagent then travels through the diffuser body section 15 and is exhausted through discharge port 16. Upon mixing with the high velocity steam and during passage through the diffuser body section, evaporation of the aqueous reagent occurs and the reagent and steam are thoroughly mixed. Freezing hazards associated with winter operation are also alleviated.

The discharged steam will condense to form an ultra-fine fog in a gas stream provided that the gas stream is maintained at certain conditions of temperature and relative humidity. Temperature of the gas stream must be lower than that of the discharging steam so as to absorb the heat of condensation. The minimum temperature differential required depends to some extent upon the relative gas and steam flow rates but in any event must be greater than about 10° F. and preferably greater than about 25° F. Relative humidity of the gas stream must be sufficiently high so that addition of the steam produces super saturation. In a preferred embodiment, the gas stream is essentially saturated or displays a relative humidity of, or approaching, 100%.

The fog, or droplet dispersion, produced in this manner has the general appearance of a natural fog being essentially non-settling and flowing readily with the gas stream around physical barriers thus indicating a maximum droplet diameter of perhaps 20 microns and a median diameter of less than about 10 microns. Droplets of this diameter range constitute an effective reaction medium for removing noxious contaminants from a gas stream.

Figure 2:
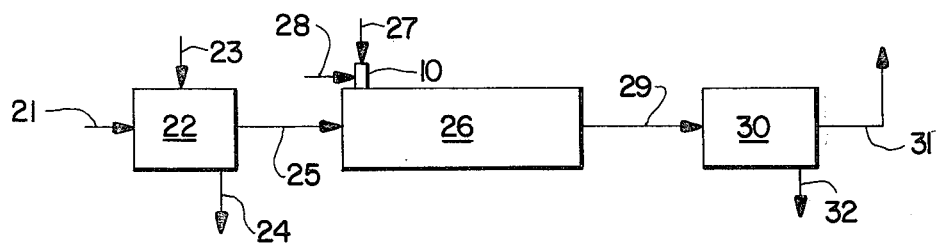
FIG. 2 is a diagrammatic flow sheet of a gas cleaning process in accordance with this invention.

Turning now to FIG. 2, there is shown a schematic flowsheet of a gas cleaning process using the reactive droplet fog to chemically interact with noxious or otherwise undesirable constituents of the gas stream. A gas stream 21 containing noxious contaminants, as for example odorous or acidic gases, is passed to gas conditioning zone 22. Within zone 22, the temperature and relative humidity of the gas are adjusted to levels whereat condensation of the ejector discharge stream will form a fog-like dispersion of microdroplets. Ordinarily, gas conditioning can be accomplished by subjecting the gas stream to a water spray as in an open spray tower. Water may be introduced via conduit means 23 to supply spray nozzles (not shown) at or near the top of the conditioning zone. Excess water is removed from the bottom of the zone via line 24 and may be either recycled or passed to waste as appropriate. Use of a water spray to condition the gas stream acts both to cool the gas and to increase its relative humidity to near saturation levels. It is to be noted that the conditioning step is not needed with all gas streams as some waste process gas streams are already at appropriate levels of temperature and relative humidity or closely thereto, and the additional humidification will be achieved by the steam addition.

A conditioned gas stream 25 is then passed to reaction zone 26. Zone 26 may comprise a tank-like vessel as in U.S. Pat. No. 4,125,589, a reactor such as that described and claimed in copending, commonly assigned patent application Ser. No. 103,321 or a conduit, such as a relatively large diameter pipe, disposed in essentially any attitude ranging from horizontal to vertical. The reaction zone may even comprise a stack in those instances where both the chemical reagent and the reaction product of that reagent with the undesirable constituents of the gas stream are amenable to discharge into the atmosphere.

One or more ejectors 10 discharge into reaction zone 26 suitably at or near the entry point of conditioned gas stream 25. Each ejector is provided with a steam supply 27 and an aqueous, reagent containing stream 28. Dry steam at pressures ranging from about 25 to about 150 psig, and more preferably in the range of about 50 to 100 psig, is suitable for use. Reagent stream 28 is supplied to the ejector at a controlled rate as by means of a flow restrictor, metering pump or the like or by means of the vacuum drawn by the ejector and then controlled by a metering valve, flow restriction or the liquid head relative to the ejector.

The ejector exhaust, discharging into the conditioned gas stream, thoroughly mixes therewith and is cooled causing the steam to condense into a fog-like dispersion of reagent-containing liquid droplets. These droplets are of a size range whereat they are essentially non-settling and remain intimately dispersed throughout the gas stream as it traverses reaction zone 26.

Reaction zone 26 is sized according to the flow rate of the conditioned gas stream so as to provide adequate time for the reaction between the chemical reagent and the contaminant component of the gas stream to proceed to the desired degree of completion. In most instances, reaction time required will range from about 0.5 to about 30 seconds. Reaction time is determined in large degree by the relative reactivity between the chemical reagent and the contaminant and by the acceptable residual concentration of contaminant material in the gas stream.

The droplet-containing gas stream is then passed from the reaction zone via conduit means 29 to liquid-gas separation means 30. Means 30 may comprise a condensing indirect contact heat exchange means such as that disclosed in the inventor's prior U.S. Pat. No. 4,141,702 or may comprise a cyclone-type separator, a demister or similar suitable device. A clean gas stream 31 is removed from separation zone 30 while an aqueous waste stream 32, containing the reaction product of the reagent and contaminant, is passed from the zone for further treatment, if necessary, and disposal.

The weight ratio of steam to aqueous reagent must be maintained sufficiently high to obtain a high degree of evaporative mixing within the ejector. In most cases, this requires a steam to reagent weight ratio of at least about 2 and preferably greater than about 5. Further, the steam rate must be sufficiently high to draw a vacuum and to initiate and maintain the flow of chemical reagent into the steam. The steam rate to the ejector must be sufficient to provide a liquid droplet concentration in the conditioned gas after condensation of at least about 0.01 gallons per thousand cubic feet. A liquid droplet concentration in the gas ranging from about 0.01 to about 1.0 gallons per thousand cubic feet is appropriate for contaminant removal from most process waste gas streams. In some instances wherein the contaminant concentration is quite high, as in some sulfur dioxide containing combustion gas streams, a higher droplet concentration will be required.

Concentration of the reagent or reactive chemical in the solution fed to the ejector is determined primarily by the reagent concentration desired in the condensed droplet fog. For example, use of this process in the neutralization of commonly occurring odors of organic sulfides, amines, aldehydes, ketones and esters, which are often present in waste gas streams derived from food and food waste processing, typically requires an oxidizing agent, suitably sodium hypochlorite, to react with the odorous moiety. Other odorous compounds are effectively neutralized or destroyed by acids such as hydrochloric or sulfuric or bases such as sodium hydroxide. A practical reagent concentration in the fog droplets may range from about 100 to 1000 ppm. In this case, sodium hypochlorite concentration in the solution fed to the ejector would typically be standard commercial solutions such as 10% to 15% sodium hypochlorite. In the case of an acid gas containing stream such as a flue gas derived from the burning of a sulfur containing fuel, both the liquid droplet concentration in the conditioned gas and the reagent concentration in the fog droplets would usually be higher. A water soluble alkaline compound such as sodium hydroxide or sodium carbonate is suitable for use in the treatment of acid gas containing streams.

Because of the reaction characteristics of a fog-like liquid droplet dispersion in a gas stream, it is often possible to obtain an essentially stoichiometric reaction between the reagent and the contaminant with substantially complete reagent useage. As has been set out before, substantially complete reagent useage may be accomplished because of the vastly increased number of droplets present per unit volume of reaction zone compared to conventional spray washing techniques, the huge reactive surface area of the droplets and the increased effective contact time between the gas and the droplets because of extremely slow free falling velocity of the individual droplets, typically less than about 1 foot per second. In most instances, it is preferred to introduce the aqueous reagent into the reaction gas at a rate which provides a small stoichiometric excess of that required to react with the contaminant material; generally in the range of about 110% to 150% of stoichiometric requirements. In this way, the volume and reactivity of the liquid waste stream recovered from the gas-liquid separation means are minimized, recycle of reagent is unneeded and problems of liquid waste disposal are lessened.

This process may also be effective to remove suspended particulate matter, particularly particulate matter in the micron and sub-micron size range, from the gas stream. Suspended aerosol particles serve as condensation nuclei for the steam issuing from the ejector exhaust. As water condenses upon the aerosol particles, they are increased in size and mass and are removed as a component of the liquid waste stream in the liquid-gas separation means.

Although the invention has been described in relation to the cleaning of certain exemplary gas streams, its use is not limited thereto. As will be appreciated by those skilled in the art, the process is useful for the cleaning of essentially all those gas streams amenable to conventional wet scrubbing techniques.

What is claimed:

1. A process for forming a fog-like dispersion of reagent-containing aqueous microdroplets in a gas stream which comprises:

supplying steam as the motive gas to an ejector, said ejector adapted to accept a liquid suction stream;

supplying an aqueous solution of a chemical reagent to the suction inlet of said ejector;

evaporating said aqueous solution within said ejector to form a mixture of reagent and steam;

discharging said mixture of reagent and steam from said ejector into a gas stream, and maintaining the temperature and relative humidity of said gas stream at levels whereat said ejector discharge condenses to form a dispersion of very finely divided, reagent-containing liquid droplets in said gas stream.

2. The process of claim 1 wherein said gas stream contains a gaseous contaminant reactive toward said reagent.

3. The process of claim 2 wherein liquid droplets containing the reaction product of said reagent with said contaminant are separated from said gas stream.

4. The process of claim 2 wherein said gas stream is essentially saturated with respect to water vapor prior to mixing with said ejector discharge.

5. The process of claim 4 wherein said gas stream is conditioned and humidified by passing it through a water spray.

6. The process of claim 2 wherein said gas stream temperature is more than 25° F. lower than the temperature of the steam discharging from said ejector.

7. The process of claim 2 wherein steam is supplied to said ejector at a rate sufficient to provide a liquid droplet concentration in the gas stream after condensation of at least about 0.01 gallons per 1000 cubic feet.

8. The process of claim 7 wherein the weight ratio of steam to aqueous reagent supplied to said ejector is greater than 2.

9. The process of claim 2 where the reagent containing liquid droplets as in contact with said gas stream for more than 0.5 seconds.

10. The process of claim 9 wherein the reagent contained in said liquid droplets is in stoichiometric excess relative to the contaminant in said gas stream.

11. The process of claim 2 wherein said gas stream contains suspended particulate matter of aerosol size.

12. The process of claim 2 wherein said contaminant is odorous and said reagent is an oxidizing agent.

13. The process of claim 12 wherein said oxidizing agent is sodium hypochloride.

14. The process of claim 2 wherein said contaminant is acidic and wherein said reagent is alkaline.

15. The process of claim 14 wherein said acidic contaminant is sulfur dioxide and wherein said reagent is selected from the group consisting of sodium hydroxide and sodium carbonate.

16. The process of claim 2 wherein said contaminant is odorous and wherein said reagent is acidic.

* * * * *